United States Patent [19]
Ben-Shalom

[11] Patent Number: 5,996,964
[45] Date of Patent: Dec. 7, 1999

[54] MAGNETIC FLOW CONTROLLER

[75] Inventor: Zvi Ben-Shalom, Ariel, Israel

[73] Assignee: Q-Core Ltd., Ariel, Israel

[21] Appl. No.: 09/125,437

[22] PCT Filed: Sep. 1, 1997

[86] PCT No.: PCT/IL97/00289

§ 371 Date: Aug. 18, 1998

§ 102(e) Date: Aug. 18, 1998

[87] PCT Pub. No.: WO98/53233

PCT Pub. Date: Nov. 26, 1998

[30] Foreign Application Priority Data

May 19, 1997 [IL] Israel ......................................... 120858

[51] Int. Cl.$^6$ .................................................. F16K 31/06
[52] U.S. Cl. ........................... 251/4; 251/65; 251/129.09; 251/129.17; 251/331
[58] Field of Search .................... 251/4, 65, 129.01, 251/129.09, 129.17, 331

[56] References Cited

U.S. PATENT DOCUMENTS

| | | |
|---|---|---|
| 3,982,722 | 9/1976 | Bernard ........................................ 251/4 |
| 5,593,134 | 1/1997 | Steber et al. ........................ 251/129.17 |

Primary Examiner—John Rivell
Attorney, Agent, or Firm—Renner, Otto, Boisselle & Sklar, P.L.L.

[57] ABSTRACT

An electromagnetic flow control apparatus includes a fluid flow conduit, a magnetic membrane, and a plurality of discrete sources of selectably variable magnetic fields, such as electromagnets, arranged in an ordered array, to drive the membrane in a desired manner to control the flow of fluid in the conduit. The membrane can preferably be driven between two extreme positions wherein the flow of fluid in the conduit is totally unrestricted in the rest position of the membrane and wherein the flow is highly restricted or stopped completely in the maximum deformation of the membrane radially inward.

26 Claims, 6 Drawing Sheets

MAGNETIC FLOW CONTROLLER

FIELD OF THE INVENTION

The present invention relates to flow control apparatus in general, and to electromagnetic flow control apparatus, in particular.

BACKGROUND OF THE INVENTION

There exist many devices and methods for controlling fluid flows, whether these flow are in open channels or in closed conduits. Areas in which such devices and methods find use include medical, industrial, automotive, aeronautical, sewage treatment and water management, among many others.

Many of these areas require very precise control of small quantities of fluid. Such areas include medical infusion systems, pharmaceuticals production, various vehicle systems. In many of these areas, complex mechanical or electromechanical solutions exist, although attempts have been made to find electromagnetic solutions.

An indication of the state of the art is provided by U.S. Pat. No. 3,982,722, entitled "Magnetic Control Valve." This patent describes a fluid control valve for a fluid system, particularly an air-conditioning system in a vehicle. A flow passage in the system is defined by a "radially flexible tubular member so that the flow area" thereof is variable. Three electromagnets are arranged coaxially about the tubular member, such that an annular space is formed between the electromagnets and the tubular member. Of the three electromagnets, the internal diameter of the middle one is smaller than the diameter of the outer ones, so as to create a constriction in the annular space. A volume of small iron particles is located in the annular space. In order to constrict the flow area of the tubular member, the middle electromagnet is operated so as to attract the iron particles thereto, such that they accumulate in the central area and apply a radially inward force to the tubular member, thereby narrowing the cross-sectional area thereof. The tubular member is allowed to expand when the extreme electromagnets are operated so as to attract the iron particles away from the center.

Disadvantages of the above-described structure include the fact that it provides throttling only of a fluid flow, and that it is incapable of providing high resolution, real time control of a fluid flow.

SUMMARY OF THE INVENTION

The present invention seeks to provide apparatus which is capable of changing the dynamic state of fluid flows by selective application of electromagnetic fields to a working member, which is operative to directly influence the fluid flow. The present invention is further capable of providing very high resolution activation of a working member, and is further capable of providing selectable variation in time of the activation of a working member in real time. The present invention is also, due to a minimal number of working parts, highly reliable.

There is thus provided, in accordance with a preferred embodiment of the invention, an electromagnetic flow control apparatus which includes a fluid flow conduit, a magnetic membrane, and a plurality of discrete sources of selectably variable magnetic fields, such as electromagnets, arranged in an ordered array, to drive the membrane in a desired manner to control the flow of fluid in the conduit. The membrane can preferably be driven between two extreme positions wherein the flow of fluid in the conduit is totally unrestricted in the rest position of the membrane and wherein the flow is highly restricted or stopped completely in the maximum deformation of the membrane radially inward.

Further, in accordance with a preferred embodiment of the present invention, the electromagnetic flow control apparatus additionally includes a control device to selectively activate the array of electromagnets so to produce a desired deformation in the magnetic membrane and a desired time variation thereof.

In accordance with a preferred embodiment of the present invention, the flow control apparatus is an integrated fluid flow conduit and electromagnetic control apparatus wherein the magnetic membrane is the body of or is embedded in the fluid flow conduit. In accordance with an alternative embodiment of the present invention, the flow control apparatus encloses an existing fluid flow conduit and controls the fluid flow therein by exerting pressure thereon from without.

In accordance with additional embodiments of the present invention, the flow control apparatus additionally includes a rod member, which may be made of magnetic material, located centrally in the fluid flow conduit along the length of the flow control apparatus. Such a rod can enhance the capability of the flow control apparatus to cut off the flow of fluid in the conduit.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

Figure 1:
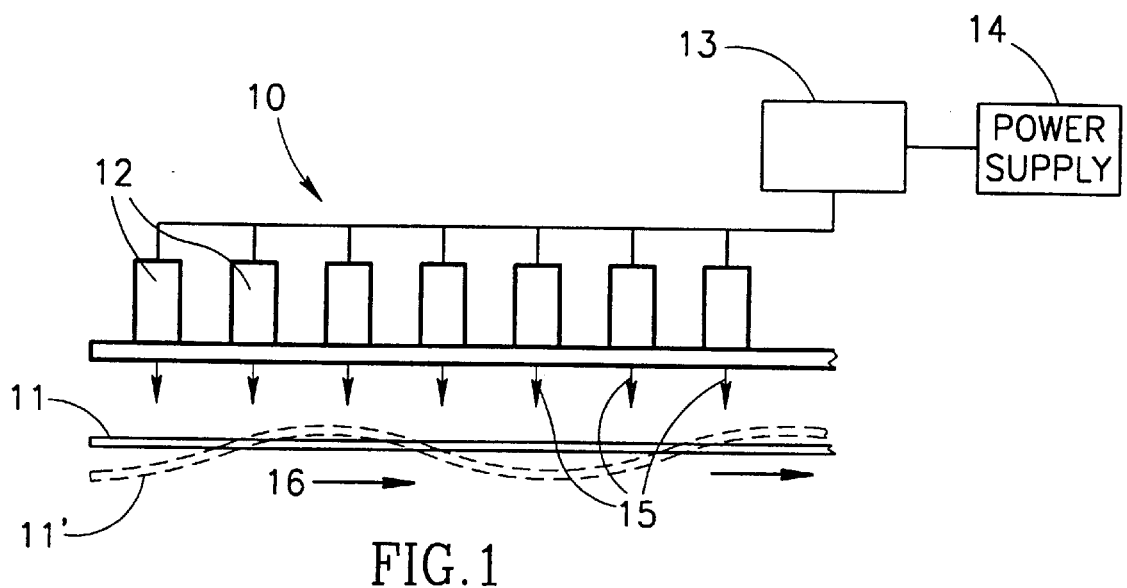
FIG. 1 is a schematic cross-sectional view of flow control apparatus, constructed in accordance with a first embodiment of the invention, in which a magnetic membrane is controlled via a single array of electromagnets, only.

Referring, now to FIG. 1, there is shown, schematically, a fluid flow control device, referred to generally as 10, in accordance with a first embodiment of the present invention. A magnetic membrane 11 is located opposite an array of electromagnets 12. The array may be linear, as in FIG. 1, or planar. Electric power from the power supply 14 is distributed among the electromagnets of the array 12 by a controller and driver unit 13 so as to create varying magnetic fields 15 which produce a desired wavelike, dynamic, deformation of the membrane 11'. When the membrane is placed within or adjacent to a fluid flow conduit with fluid flowing therein, as shown by arrows 16, the deformation will cause a corresponding variation in the fluid flow characteristic. The use of a plurality of electromagnets 12 and the electronic control thereof to produce electromagnetic fields 15 acting on the membrane element 11 which directly affects the fluid flow, provides high resolution and real time control thereof.

Figure 7:
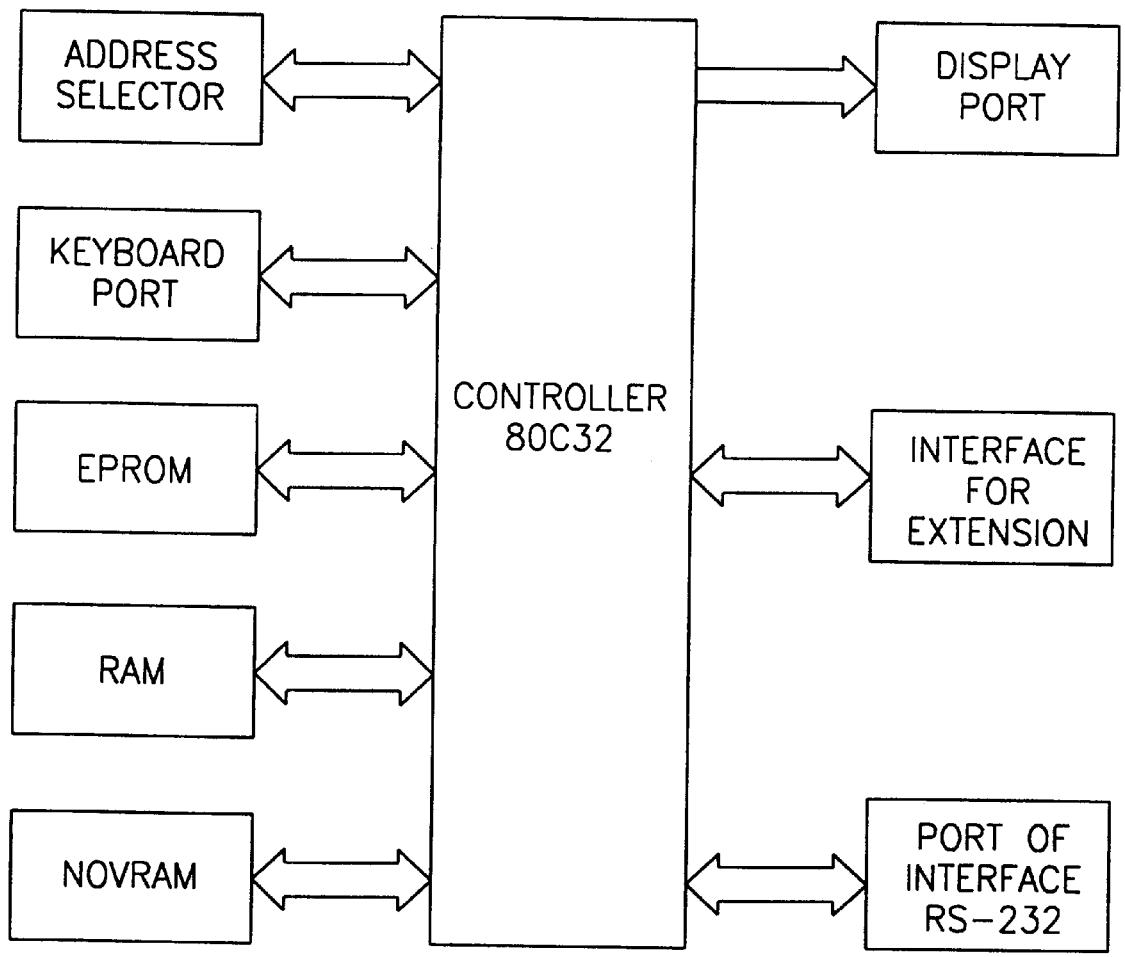
FIG. 7 is a block diagram of a controller circuit forming part of the apparatus shown in FIG. 1.
Figure 8:
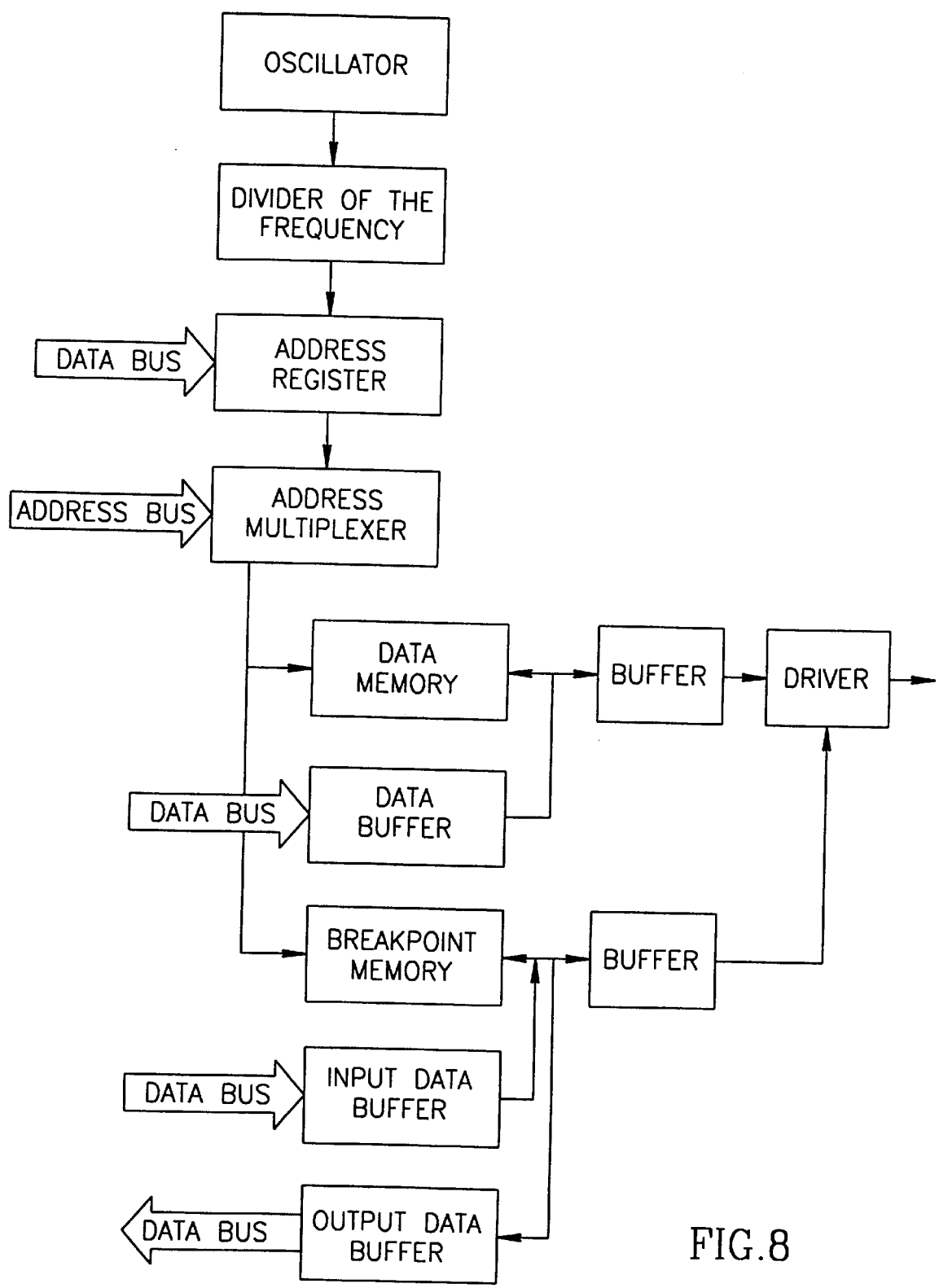
FIG. 8 is a block diagram of a driver circuit forming part of the apparatus shown in FIG. 1.

FIGS. 7 and 8 show block diagrams of examples of controller and driver circuits, respectively, which together may constitute controller and driver unit 13 shown in FIG. 1. These circuits, as will be understood by persons skilled in the art, are operative to distribute power to the electromagnets of the array to create the aforementioned varying magnetic fields.

As will be understood by persons skilled in the art, magnetic membrane 11 can have a number of alternative configurations. These may be, in alternative embodiments of the invention, by way of example, any of the following:

a single membrane made of a flexible magnetic material, such as polyethylene impregnated with iron filings or with nickel a compound membrane having joined magnetic and non-magnetic layers wherein the magnetic layer transfers forces resulting from its deformation as described above to the non-magnetic layer a single non-magnetic membrane having magnetic elements embedded therein a single non-magnetic membrane having magnetic elements attached to its surface It will be further understood by persons skilled in the art that such magnetic elements may be permanent magnets or other magnetic material.

Figure 2:
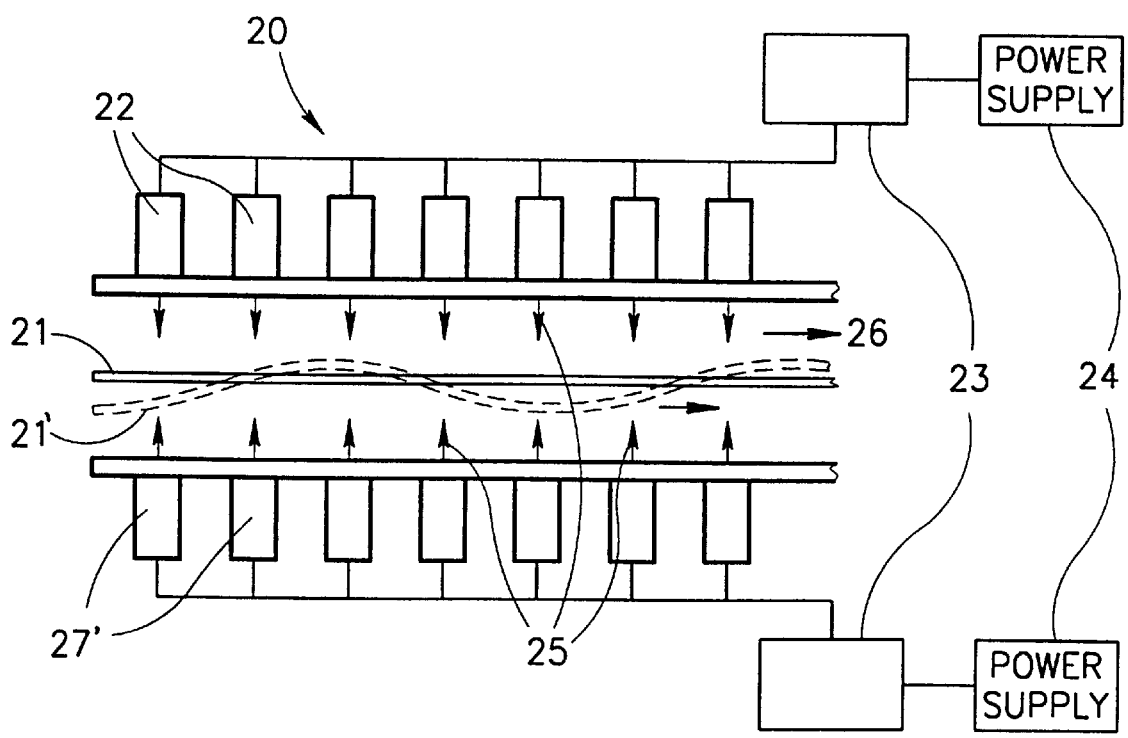
FIG. 2 is a schematic cross-sectional view of flow control apparatus, constructed in accordance with a second embodiment of the invention, in which a magnetic membrane is controlled via a pair of electromagnet arrays.

In a second embodiment of the present invention, shown schematically in FIG. 2, a second array of electromagnets 27, similar to the first array 22, is located opposite the magnetic membrane 21. The use of an additional array provides enhanced spatial and temporal response in the magnetic membrane 21 with resulting enhanced control of the flow of the fluid in the conduit.

As will be understood by persons skilled in the art, the more discrete locations whereat electromagnetic fields can be applied to the magnetic membrane, the greater is the resolution of the control over the deformation thereof.

Figure 3A:
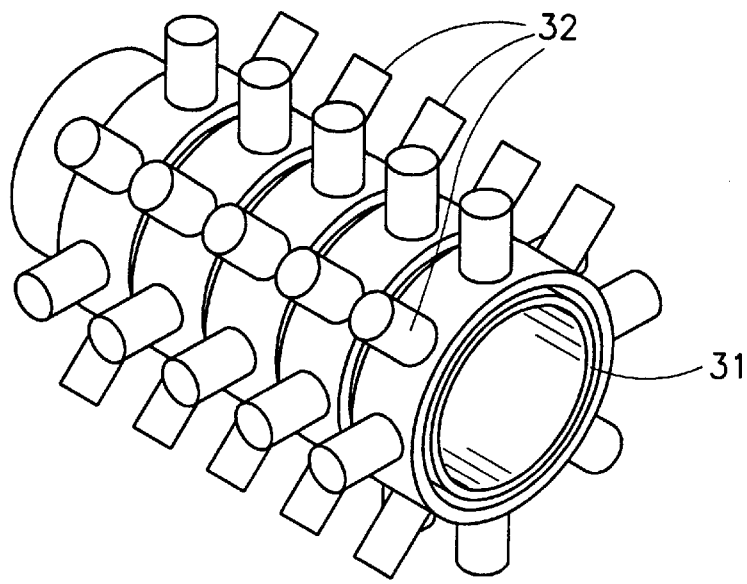
FIGS. 3A, 3B, and 3C are isometric, side-sectional, and cross-sectional views, respectively, of an integrated fluid flow conduit and electromagnetic flow control apparatus, constructed in accordance with a third embodiment of the invention.
Figure 3B:
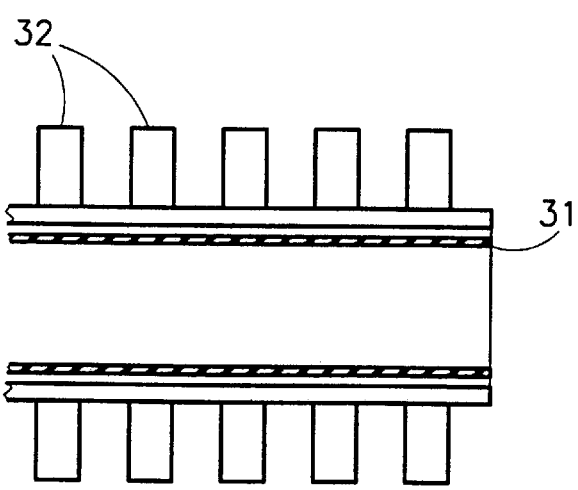
Figure 3C:
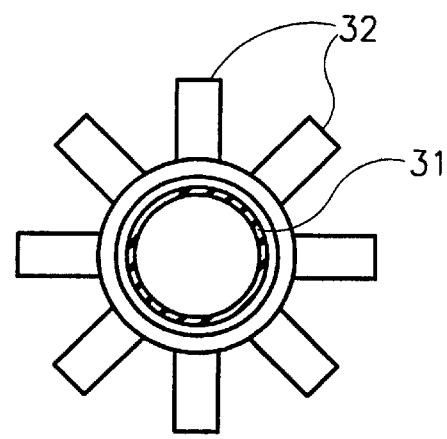
Figure 4A:
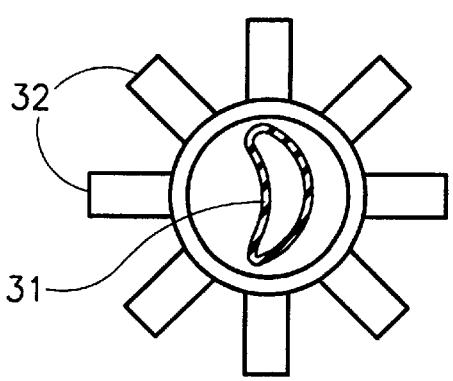
FIGS. 4A and 4B are cross-sectional views of the conduit of FIGS. 3A, 3B and 3C, in partially closed and fully closed positions, respectively.
Figure 4B:
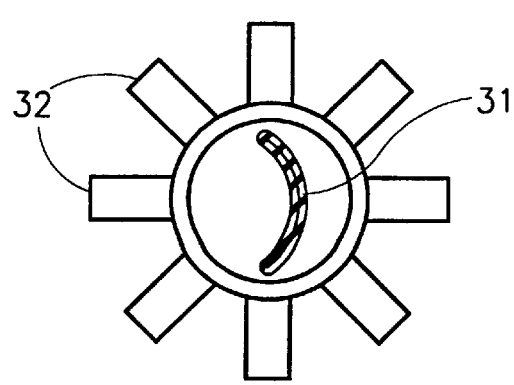

Referring now to FIGS. 3A, 3B, and 3C, there is shown, in isometric, side-sectional, and cross-sectional views, respectively, an integrated fluid flow conduit and electromagnetic flow control apparatus, constructed in accordance with a preferred embodiment of the present invention. In this embodiment, a plurality of arrays of electromagnets 32 are arranged cylindrically around a fluid flow conduit 31 whose walls are made of magnetic material. FIG. 3C shows the cross-sectional view of the conduit 31 when it is fully open. FIGS. 4A and 4B, show the conduit 31 when it is partially closed and fully closed, respectively, as a result of the application of suitable magnetic fields via the arrays of electromagnets.

The spatial resolution of the control of the deformation of the fluid flow conduit, together with the time resolution of the control provided by electronic control of the individual electromagnets allows such embodiments of the present invention to impart a wavelike motion to fluid flows along the conduit 31 along its length, as indicated by 11' and 21' in FIGS. 1 and 2 respectively, so as to drive the flow fluid though the conduit in a peristaltic-like fashion.

Figure 5A:
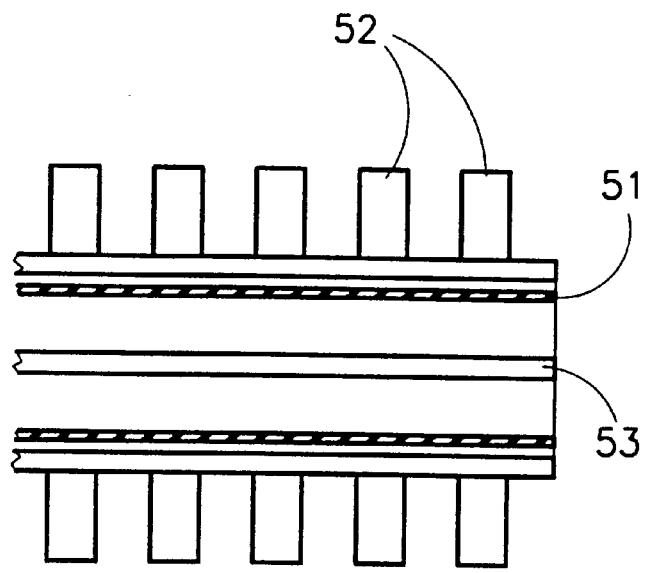
FIG. 5A is a side-sectional view of a conduit and fluid control apparatus, similar to that of FIGS. 3A–4B, but including a rod member extending longitudinally therein.
Figure 5B:
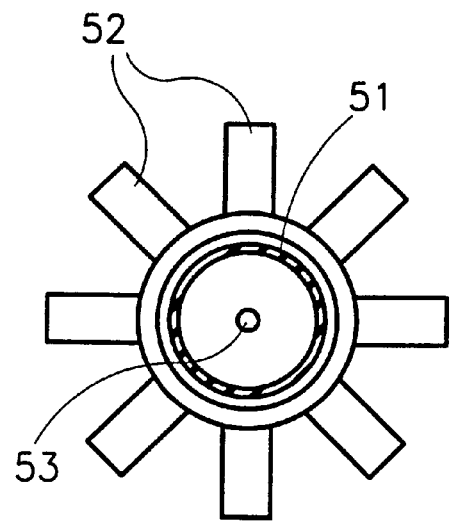
FIGS. 5B and 5C are cross-sectional views of the conduit of FIG. 5A, in fully open and fully closed positions, respectively.
Figure 5C:
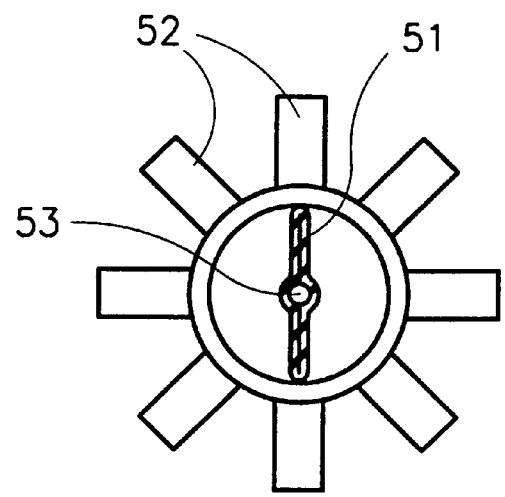

Referring now to FIGS. 5A, 5B, and 5C, there is shown an alternative embodiment of the present invention wherein an integrated fluid flow conduit and electromagnetic flow control apparatus additionally includes a rod 53 running longitudinally in the center of the fluid flow conduit 51. Rod 53 is supported by any suitable mounting elements (not shown). When the magnetic elements 52 are activated to close the fluid flow conduit 51, as shown in FIG. 5C, the magnetic membrane wall of the conduit 51 presses against the rod 53, thereby providing a firmer seal to close the conduit to fluid flow. In accordance with a further embodiment of the present invention, the rod 53 may be made of magnetic material in order to enhance the magnetic force for closing the fluid flow in the conduit 51.

Figure 6A:
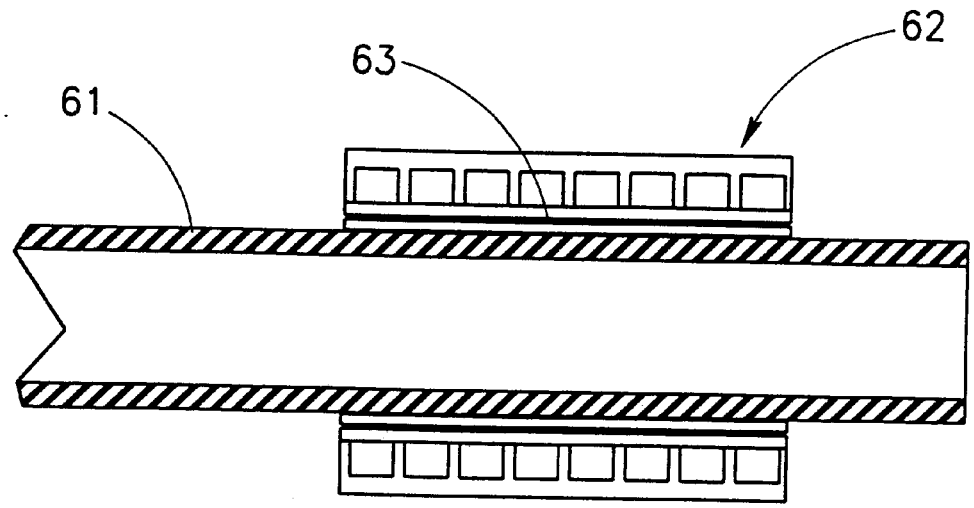
FIG. 6A is a side-sectional view of a fluid control apparatus, according to another embodiment of the invention, for use with an existing fluid flow conduit, also shown in the figure.
Figure 6B:
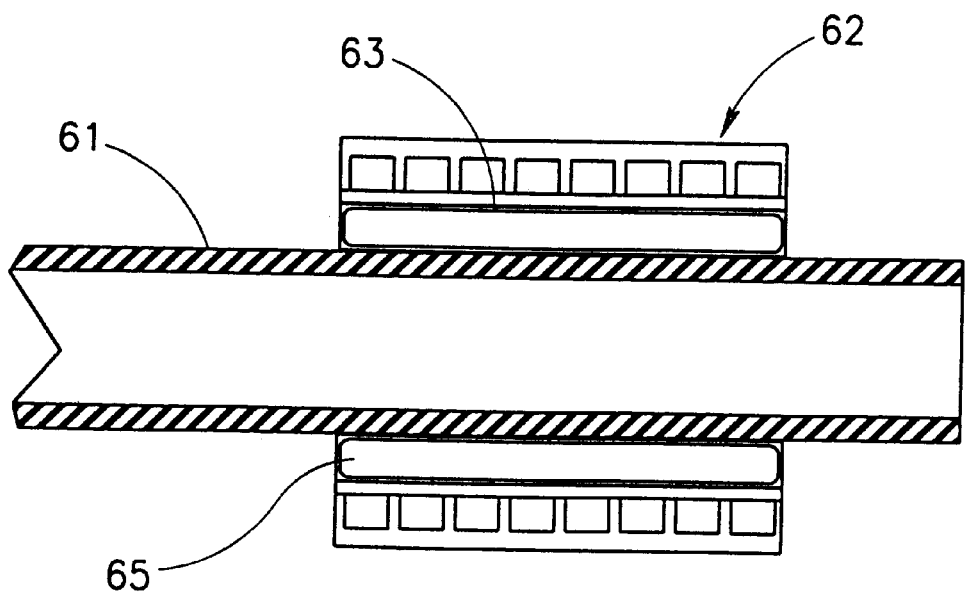
FIG. 6B is a side-sectional view of a fluid control apparatus similar to that in FIG. 6A, with the addition of a protective air cushion around the existing fluid flow conduit.

In a further preferred embodiment of the present invention, an electromagnetic flow control apparatus 62 is employed in conjunction with an existing fluid flow conduit 61, as shown in FIGS. 6A and 6B. In this embodiment of the invention, an electromagnetic flow control apparatus 62, including a magnetic membrane 63, is a sleeve-like construction that is placed around a segment of an existing fluid flow conduit 61. The deformation of the magnetic membrane 63 in response to the magnetic fields produced by the apparatus 62 presses on the conduit to control the fluid flow therein. In an alternative embodiment of the invention, the electromagnetic flow control apparatus 62 may include a gas-filled cell 65 separating the magnetic membrane 63 from the fluid flow conduit 61 to provide a cushion to protect the conduit from excessive forces.

It will be appreciated by persons skilled in the art that the present invention is not limited by what has been shown and described hereinabove, merely by way of example. Rather, the scope of the present invention is limited solely by the claims, which follow.

I claim:

1. Flow control apparatus which includes:

magnetic membrane apparatus arranged in association with a working fluid; and apparatus for selectably applying varying electromagnetic fields to said magnetic membrane means at a plurality of discrete locations therealong, thereby to drive said membrane means in a selected manner and thus to change the dynamic state of the working fluid accordingly.

2. Flow control apparatus according to claim 1, wherein said magnetic membrane apparatus includes:

a non-magnetic layer; and a magnetic layer arranged in force transfer association with said non-magnetic layer, wherein said magnetic layer is operative, in response to application thereto of electromagnetic fields, to drive said non-magnetic layer accordingly.

3. Flow control apparatus according to claim 1, wherein said magnetic membrane apparatus includes a non-magnetic membrane having magnetic elements arranged in fixed association therewith.

4. Flow control apparatus according to claim 3, wherein said magnetic elements are implanted in said non-magnetic membrane.

5. Flow control apparatus according to claim 3, wherein said magnetic elements are affixed to a surface of said non-magnetic membrane.

6. Flow control apparatus according to claim 3, wherein said magnetic elements are permanent magnets.

7. Flow control apparatus according to claim 1, wherein said apparatus for applying electromagnetic fields includes apparatus for applying varying electromagnetic fields to said magnetic membrane apparatus generally perpendicular thereto.

8. Flow control apparatus according to claim 1, wherein said apparatus for applying electromagnetic fields includes apparatus for moving said magnetic membrane apparatus so as to impart thereto a predetermined wave motion.

9. Flow control apparatus according to claim 1, wherein said magnetic membrane apparatus has a curved planar shape when at rest, and said apparatus for applying electromagnetic fields includes apparatus for varying the degree of curvature of said magnetic membrane means.

10. Flow control apparatus according to claim 1, wherein said apparatus for applying electromagnetic fields includes:
- a plurality of electromagnets arranged at discrete locations along said membrane apparatus; and
- control apparatus for activating said electromagnets in a predetermined manner so as to move said magnetic membrane apparatus in a corresponding manner.

11. Flow control apparatus according to claim 10, wherein said magnetic membrane apparatus is formed into a tube for carrying a fluid flow, said plurality of electromagnets are arranged at discrete locations along said tube and are further arranged radially thereabout, and
- said control apparatus is operative to activate said electromagnets in a predetermined manner so as to vary the cross-sectional configuration of said tube at predetermined locations therealong between predetermined first and second extreme positions,
- wherein, when said tube is in said first extreme configuration, said plurality of electromagnets are not operated, and said tube is an a fully open, at rest position, thereby permitting flow therethrough,
- and when said tube is in said second extreme position, said plurality of electromagnets are operated so as to force opposing wall portions of said tube radially inward, thereby to reduce the cross-sectional area of said tube so as to constrict fluid flow therealong.

12. Flow control apparatus according to claim 11, and also including a rod located inside said tube and extending longitudinally therealong, wherein, when said tube is in said second extreme position, said wall portions of said at least a portion of said tube are pressed against said rod.

13. Flow control apparatus according to claim 12, wherein said rod is magnetic.

14. Flow control apparatus which includes:
- magnetic apparatus arranged in association with a working fluid; and
- apparatus for selectably applying varying electromagnetic fields to said magnetic membrane apparatus at a plurality of discrete locations therealong, thereby to drive said magnetic apparatus in a selected manner and thus to change the dynamic state of the working fluid accordingly.

15. Flow control apparatus according to claim 14, wherein said magnetic apparatus includes:
- a non-magnetic portion; and
- a magnetic portion arranged in force transfer association with said non-magnetic portion, wherein said magnetic portion is operative, in response to application thereto of electromagnetic fields, to drive said non-magnetic portion accordingly.

16. Flow control apparatus according to claim 14, wherein said magnetic apparatus includes a non-magnetic portion having magnetic elements arranged in fixed association therewith.

17. Flow control apparatus according to claim 16, wherein said magnetic elements are implanted in said non-magnetic portion.

18. Flow control apparatus according to claim 16, wherein said magnetic elements are affixed to a surface of said non-magnetic portion.

19. Flow control apparatus according to claim 16, wherein said magnetic elements are permanent magnets.

20. Flow control apparatus according to claim 14, wherein said apparatus for applying electromagnetic fields includes apparatus for applying varying electromagnetic fields to said magnetic apparatus generally perpendicular thereto.

21. Flow control apparatus according to claim 14, wherein said apparatus for applying electromagnetic fields includes apparatus for moving said magnetic apparatus so as to impart thereto a predetermined wave motion.

22. Flow control apparatus according to claim 14, wherein said magnetic apparatus has a generally curved planar shape when at rest, and said apparatus for applying electromagnetic fields includes apparatus for varying the degree of curvature of said magnetic apparatus.

23. Flow control apparatus according to claim 14, wherein said apparatus for applying electromagnetic fields includes:
- a plurality of electromagnets arranged at discrete locations along said magnetic apparatus; and
- control apparatus for activating said electromagnets in a predetermined manner so as to move said magnetic apparatus in a corresponding manner.

24. Flow control apparatus according to claim 23, wherein said magnetic apparatus is arranged about a tube for carrying a fluid flow, said plurality of electromagnets are arranged at discrete locations along said tube and are further arranged radially thereabout, and
- said control apparatus is operative to activate said electromagnets in a predetermined manner in association with said tube so as to vary the cross-sectional configuration of said tube at predetermined locations therealong between predetermined first and second extreme positions,
- wherein, when said tube is in said first extreme configuration, said plurality of electromagnets are not operated, and said tube is an a fully open, at rest position, thereby permitting flow therethrough,
- and when said tube is in said second extreme position, said plurality of electromagnets are operated so as to force opposing wall portions of said tube radially inward, thereby to reduce the cross-sectional area of said tube so as to constrict fluid flow therealong.

25. Flow control apparatus according to claim 24, and also including a rod located inside said tube and extending longitudinally therealong, wherein, when said tube is in said second extreme position, said wall portions of said at least a portion of said tube are pressed against said rod.

26. Flow control apparatus according to claim 25, wherein said rod is magnetic.

* * * * *

UNITED STATES PATENT AND TRADEMARK OFFICE
CERTIFICATE OF CORRECTION

PATENT NO.: 5,996,964

DATED: December 7, 1999

INVENTOR(S): Zvi Ben-Shalom

It is certified that error appears in the above-identified patent and that said Letters Patent is hereby corrected as shown below:

In the Claims:
In column 4, line 45, replace "means" with --apparatus--.

In column 4, line 47, replace "means" with --apparatus--.

In column 5, line 55, "magnetic membrane apparatus" should read --magnetic apparatus--.

Signed and Sealed this

Twenty-seventh Day of March, 2001

NICHOLAS P. GODICI

*Attest:*

*Attesting Officer*    *Acting Director of the United States Patent and Trademark Office*